United States Patent
Wallays

[11] Patent Number: 5,931,346
[45] Date of Patent: Aug. 3, 1999

[54] DECORATING BAG

[75] Inventor: Nele Wallays, Antwerp, Belgium

[73] Assignee: Dart Industries Inc., Orlando, Fla.

[21] Appl. No.: 08/916,801

[22] Filed: Aug. 22, 1997

[51] Int. Cl.⁶ .................................................. B65D 35/38
[52] U.S. Cl. ........................................................ 222/107
[58] Field of Search ..................... 222/92, 107; 383/88, 383/89; 401/261; 425/183, 191, 376.1

[56] References Cited

U.S. PATENT DOCUMENTS

| | | | |
|---|---|---|---|
| D. 221,735 | 9/1971 | MacManus . | |
| 299,228 | 5/1884 | Kirsten | 222/107 X |
| D. 310,317 | 9/1990 | Broderick et al. . | |
| 1,294,011 | 2/1919 | Williams | 222/107 X |
| 2,092,444 | 9/1937 | Dennery | 222/107 X |
| 2,320,496 | 6/1943 | Wechsler | 222/107 |
| 2,448,376 | 8/1948 | Le Fevre | 222/107 X |
| 2,539,944 | 8/1951 | Bury | 401/261 X |
| 2,620,756 | 12/1952 | Krens | 401/261 X |
| 2,945,458 | 7/1960 | Setecka | 425/183 |
| 3,138,821 | 6/1964 | Macciocchi et al. | 401/261 X |
| 3,285,202 | 11/1966 | Macmanus | 222/107 |
| 3,446,420 | 5/1969 | Rinecker | 383/89 |
| 3,847,523 | 11/1974 | Parrish et al. | 401/261 |
| 4,205,765 | 6/1980 | May | 222/107 |
| 4,813,862 | 3/1989 | Bowers et al. | 222/107 |
| 4,961,517 | 10/1990 | Tkac | 401/261 X |
| 5,026,194 | 6/1991 | Lewis | 401/261 |
| 5,114,044 | 5/1992 | Spanek, Jr. . | |
| 5,366,116 | 11/1994 | Burtis | 222/107 |

Primary Examiner—Kenneth Bomberg
Attorney, Agent, or Firm—John A. Doninger; Taylor J. Ross

[57] ABSTRACT

The decorating bag, when empty and flattened into a generally triangular shape, has the lower discharge portion thereof folded to overlie the upper filling portion thereof with the extended corner sections of the filling portion folded to overlie the folded lower portion and engage each other with releasable fasteners to secure the bag in a folded and stored configuration.

10 Claims, 2 Drawing Sheets

DECORATING BAG

BACKGROUND OF THE INVENTION

Decorating or pastry bags for the dispensing of viscous comestibles used in the decorating of cakes, pastries, and the like are both old and well known. Such bags are formed of a substantially waterproof flexible material and are of a generally triangular shape with the apex end comprising a dispensing opening and the base end a filling opening. The dispensing opening will frequently receive a mounting collar which in turn mounts a dispensing nozzle which may be one of a series of interchangeable dispensing nozzles.

One problem which arises with regard to the use of a conventional decorating bag is how one would temporarily put down a partially filled bag, as for example while removing decorated pastry and positioning new pastry. If one merely lays the bag down on a countertop, there will obviously be a tendency for the viscous material to flow from the large filling opening. Any discharge through the discharge opening will normally be prevented, in the absence of a manual collapsing of the bag, due to the restrictive configuration of the nozzle.

Another problem frequently encountered with regard to conventional decorating bags is the absence of any provision for the storing of empty and cleaned bags and the nozzle or nozzles normally used therewith.

SUMMARY OF THE INVENTION

The decorating bag of the present invention, while similar to conventional bags in being formed of a flexible foldable material in a generally triangular configuration, differs significantly in that the bag of the invention includes means for temporarily accommodating a partially empty bag during periods of non-use.

Similarly, it is an important object of the invention to provide for the compacting of an empty bag, preferably with the nozzle or set of nozzles stored therein, and, through cooperating fasteners, retaining the bag in a collapsed position for storage purposes.

Basically, the bag of the invention, at an upper corner section thereof adjacent the wide filling mouth, has a hanging loop affixed thereto for a temporary suspension of the bag from a hook or peg with the filling mouth uppermost to avoid spillage during short periods when a filled or partially filled bag is not actually in use.

In order to provide for a more permanent storage of the bag when empty, along with the accessories, the bag of the invention, after a positioning of the nozzles and the like therein, has the apex end portion of the bag folded to overlie the upper base portion of the bag, after which the opposed upper corner portions of the bag are folded in overlying relation thereto wherein a neat and compact storage package is provided. In order to retain the bag in this storage position, the opposed upper corner portions include cooperating fastener components which align and engage with each other upon an inward folding of these corner portions. So formed, a maximum of only three folds are required, thus avoiding excessive disruption of the bag material and providing a compact package easily accommodated in a drawer or, depending on the specific location of the hanging loop, stored on a hook or peg.

Other features, objects and advantages of the invention will become apparent from the more detailed description of the invention following hereinafter.

DESCRIPTION OF PREFERRED EMBODIMENT

Referring now more specifically to the drawings, the bag 10 is formed of an appropriate substantially waterproof flexibly collapsible material. The bag, when empty, is of a generally triangular configuration with an enlarged upper base end defining a dispensing opening 12 and a lower and smaller apex end defining a dispensing opening 14.

Figure 1:
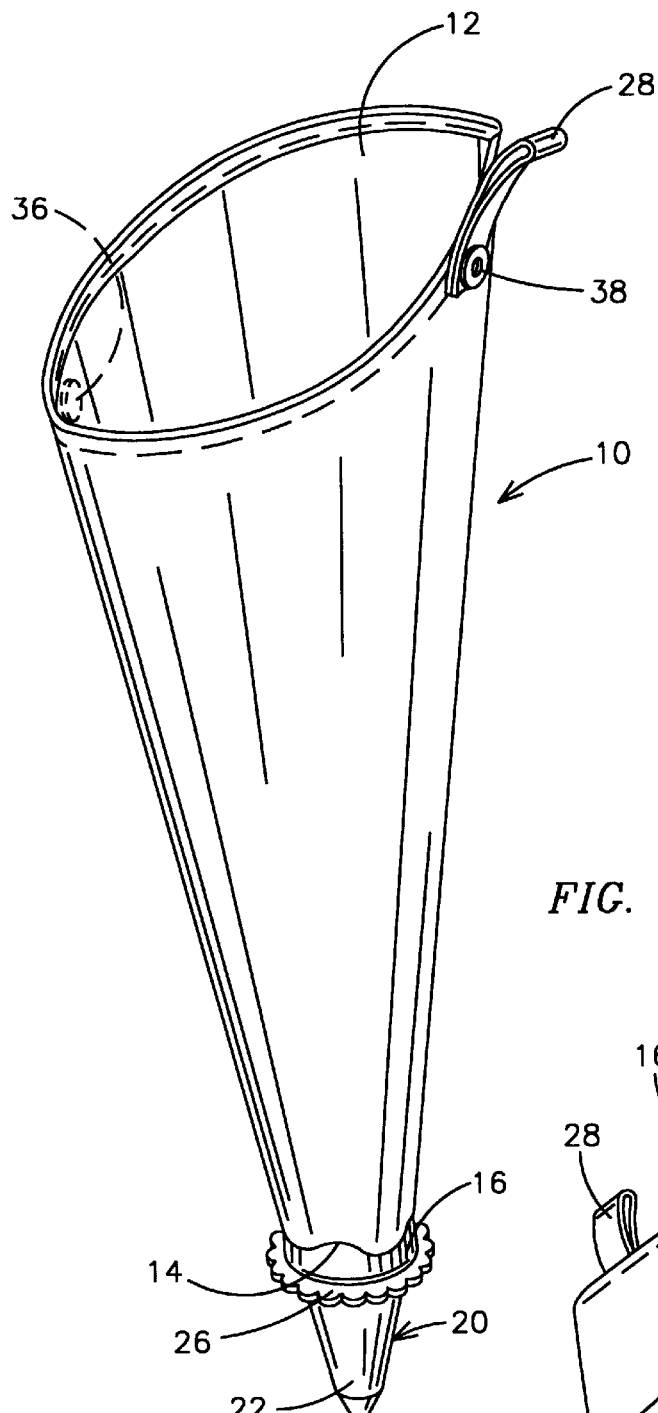
FIG. 1 is a perspective view of the decorator bag of the invention expanded to accommodate a viscous material.

Noting FIG. 1, the bag 10, when fully open, either when filled with viscous material to be dispensed or positioned to receive such material through the filling opening 12, is of an inverted generally conical configuration with the apex end lowermost. In order to control the dispensing of viscous material from the bag, a truncated conical mounting collar 16 is snugly engaged within the lower portion of the bag. The exterior taper of the collar 16 is such as to frictionally engage within the lower portion of the bag with the lower end portion of the mounting collar partially projecting through the dispensing opening 14. The lower portion of this collar is internally threaded, as at 18, to removably mount a plurality of interchangeable nozzles 20 differing primarily in the discharge configuration of the spout 22. Each nozzle 20 includes an externally threaded nipple 24 aligned with and oppositely directed relative to the spout 22 for threaded reception within the threaded portion 18 of the collar 16. In order to facilitate a mounting of the nozzle, and avoid any tendency for the mounted nozzle and collar to retract into the bag, the nozzle is also provided with an integral outwardly projecting peripheral flange 26 between the spout 22 and nipple 24. This flange will preferably include a series of gripping protuberances defining the peripheral outer edge thereof.

The open nature of the bag can cause problems when a user wishes to temporarily place a filled or partially filled bag aside. In order to accommodate such a situation, the bag 10 of the invention is provided with a hanging loop 28 affixed to the upper portion of the bag adjacent and slightly below the filling opening 12, the loop being of a size for convenient accommodation over a hook, peg or the like for a suspension of the bag therefrom.

In those instances wherein an empty bag is to be stored away, provision is made for a unique folding of the bag into a small self-contained package which can internally accommodate the mounting collar, a stack of interchangeable nozzles and other small accessories which might be used in the dispensing operation. More specifically, the emptied and cleaned bag 10 assumes a generally flat triangular configuration wherein overlying front and rear bag panels 30 and 32 and opposed converging side edges are formed. The generally flat nature of the collapsed bag will be interrupted only at the lower portion thereof by the stored mounting collar 16 and a set of nozzles 20 and the like as suggested in FIG. 2.

The upper opposed corner portions or sections 34 of the bag 10 are provided with cooperating fastener components 36 and 38 one on each of the front and rear panels 30 and 32. As noted in the drawings, the fastener components are preferably components of a snap fastener. Also, as suggested in the drawings, one of the components 38 can be mounted so as to also secure the hanging loop 28.

Figure 2:
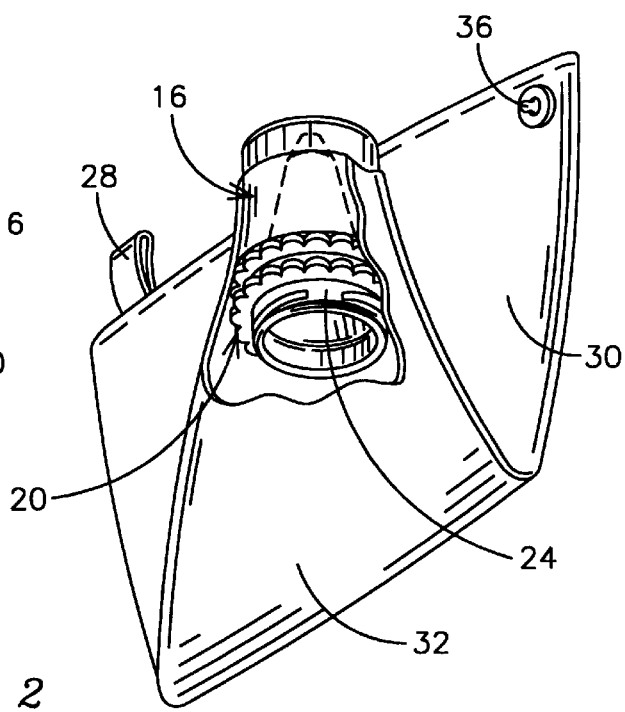
FIG. 2 illustrates a flat emptied bag with the apex portion folded over and partially broken away to illustrate nozzles stored therein.
Figure 3:
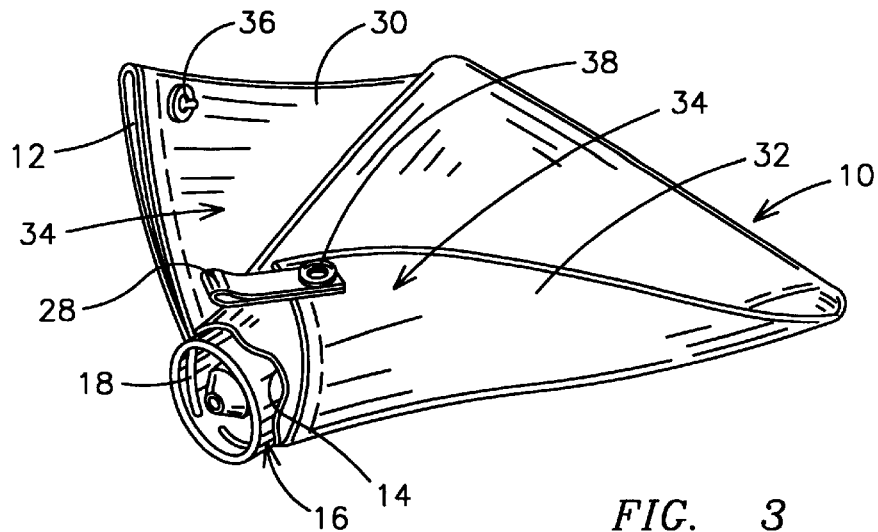
FIG. 3 illustrates a partially folded bag showing the cooperating fastener elements on the front and rear panels of the flattened bag.
Figure 4:
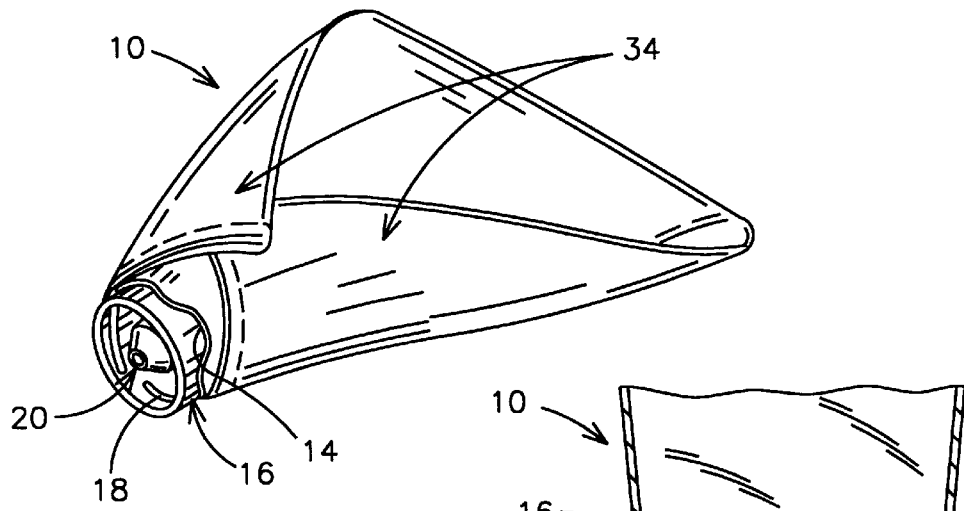
FIG. 4 illustrates the completely folded and secured bag in its storage position.
Figure 5:
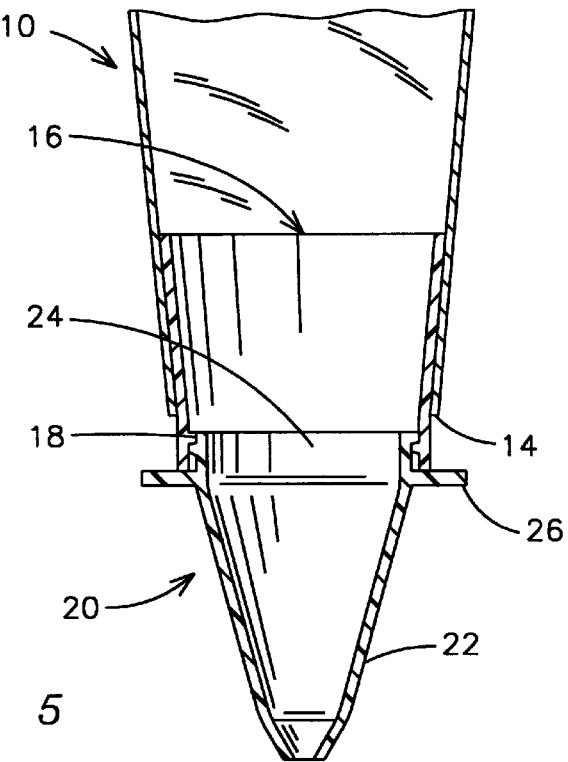
FIG. 5 is an enlarged cross-sectional view illustrating the details of a positioned mounting collar and a nozzle secured thereto.

The folding of the bag into a compact storage package, as illustrated in FIGS. 2–4, is effected by first folding the lower portion of the bag to position the discharge opening 14 in approximate alignment with the filling opening 12. This is followed by an inward folding of the opposed corner portions 34, on diagonals, to overlie each other over the folded lower portion and to align the snap fastener components for releasable locking engagement. As will be noted, the corner portion with the fastener component 38 on the rear panel 32 is folded first whereby upon an overlapping of this corner portion by the second corner portion, the fastener components 36, 38 are concealed. Thus, a smooth uninterrupted bag surface is presented with no visually apparent means for retaining the bag in its folded package configuration. As suggested in FIG. 4, the hanging loop can be concealed by the fastened corner sections 34.

It will be appreciated that the folded bag involves no more than three folds to produce a compact package with the bag accessories stored therein. No excess folding or unnecessary crumpling of the bag is involved, thereby effectively extending the life of the relatively soft bag material.

The foregoing is illustrative of the invention, and while a single embodiment has been illustrated, it is to be appreciated that it is intended the following claims encompass all embodiments within the scope of such claims.

I claim:

1. A decorating bag for pastry, said bag having an open upper end of predetermined width defining a filling opening, and an open lower end of a lesser width defining a dispensing opening, said bag being of flexible material selectively expandable to a generally conical configuration when filled through said filling opening, and selectively collapsible to a generally triangular configuration when empty, said bag, when collapsed, defining opposed front and rear panels and opposed edges extending between said upper and lower ends, said upper end and said edges meeting at upper corners and forming opposed upper corner sections, said lower end and a lower portion of the bag adjacent said lower end being foldable to overlie said front panel, said corner sections being selectively foldable over the folded lower portion, and fastener means for securing said corner sections in overlying relation to the folded lower portion wherein the lower portion is retained therebeneath to define a storage configuration.

2. The decorating bag of claim 1 wherein said fastener means comprises cooperating first and second fastener components, one on each of said corner sections.

3. The decorating bag of claim 2 wherein said first fastener component is on said front panel and said second fastener component is on said rear panel.

4. The decorating bag of claim 3 wherein both of said corner sections fold over said folded lower portion with one corner section overlapping the other corner section for alignment and engagement of the fastener components.

5. The decorating bag of claim 4 including a hanging loop fixed to one of said corner sections and extending therefrom.

6. The decorating bag of claim 4 including a nozzle mounting collar received in said bag and partially extended through said dispensing opening, said folded corner sections retaining said mounting collar within said dispensing opening in the storage configuration of said bag.

7. The decorating bag of claim 6 including decorating bag accessories retained in said bag in the storage configuration thereof.

8. The decorating bag of claim 2 including a hanging loop fixed to one of said corner sections and extending therefrom.

9. A dispensing bag for viscous comestibles, said bag having an upper portion with a filling opening defined therein, and a lower portion with a dispensing opening defined therein, said bag having a storage configuration wherein said lower portion is folded into overlying relation to said upper portion, said upper portion being wider than said lower portion and defining corner sections to each side of said folded lower portion, a first one of said corner sections being folded to overlie said folded lower portion, and a second one of said corner sections being folded to overlie said folded first one of said corner sections and said folded lower portion, and fastener means releasably securing said folded corner sections to each other wherein said folded lower portion is retained therebeneath.

10. The bag of claim 9 including a nozzle mounting collar received in said bag and having an outer portion partially projecting through said dispensing opening, said outer portion being internally threaded for the selective mounting therein of an externally threaded dispensing nozzle.

* * * * *